United States Patent
Bell et al.

(10) Patent No.: US 8,974,942 B2
(45) Date of Patent: Mar. 10, 2015

(54) BATTERY THERMAL MANAGEMENT SYSTEM INCLUDING THERMOELECTRIC ASSEMBLIES IN THERMAL COMMUNICATION WITH A BATTERY

(75) Inventors: Lon E. Bell, Altadena, CA (US); John LaGrandeur, Arcadia, CA (US); Stephen Davis, Monrovia, CA (US)

(73) Assignee: Gentherm Incorporated, Northville, MI (US)

( * ) Notice: Subject to any disclaimer, the term of this patent is extended or adjusted under 35 U.S.C. 154(b) by 380 days.

(21) Appl. No.: 12/782,532

(22) Filed: May 18, 2010

(65) Prior Publication Data

US 2010/0291414 A1 Nov. 18, 2010

Related U.S. Application Data

(60) Provisional application No. 61/179,326, filed on May 18, 2009.

(51) Int. Cl.
*H01M 10/48* (2006.01)
*H01M 10/50* (2006.01)
*H01M 2/10* (2006.01)
(Continued)

(52) U.S. Cl.
CPC ........ *H01M 10/5067* (2013.01); *H01M 2/1077* (2013.01); *H01M 10/5077* (2013.01); *H01M 10/5004* (2013.01); *H01M 10/5085* (2013.01);
(Continued)

(58) Field of Classification Search
USPC ........................................ 429/62, 72, 83, 120
See application file for complete search history.

(56) References Cited

U.S. PATENT DOCUMENTS

| 413,136 A | 10/1889 | Dewey |
|---|---|---|
| 2,363,168 A | 11/1944 | Findley |

(Continued)

FOREIGN PATENT DOCUMENTS

| CN | 1195090 | 10/1998 |
|---|---|---|
| DE | 13 01 454 | 8/1969 |

(Continued)

OTHER PUBLICATIONS

Ishizaka et al., Machine translation of JP 06089955 A, Mar. 1994.*

(Continued)

*Primary Examiner* — Sean P Cullen
(74) *Attorney, Agent, or Firm* — Knobbe, Martens, Olson & Bear, LLP

(57) ABSTRACT

In certain embodiments, a battery thermal management system includes at least one battery, at least one thermoelectric device in thermal communication with the at least one battery, and a conduit comprising an inlet configured to allow a working fluid to enter and flow into the conduit and into thermal communication with the at least one thermoelectric device. The conduit further comprises an outlet configured to allow the working fluid to exit and flow from the conduit and away from being in thermal communication with the at least one thermoelectric device. The battery thermal management system can further include a first flow control device which directs the working fluid through the inlet of the conduit and a second flow control device which directs the working fluid through the outlet of the conduit. The first flow control device and the second flow control device are each separately operable from one another.

15 Claims, 7 Drawing Sheets

(51) Int. Cl.
*H01M 10/6568* (2014.01)
*H01M 10/6563* (2014.01)
*H01M 10/613* (2014.01)
*H01M 10/6572* (2014.01)
*H01M 10/615* (2014.01)

(52) U.S. Cl.
CPC ............ *H01M 10/5006* (2013.01); *Y02E 60/12* (2013.01); *H01M 10/48* (2013.01)
USPC .................. 429/120; 429/62; 429/72; 429/83

(56) References Cited

U.S. PATENT DOCUMENTS

| | | | |
|---|---|---|---|
| 2,499,901 | A | 3/1950 | Brown, Jr. |
| 2,944,404 | A | 7/1960 | Fritts |
| 2,949,014 | A | 8/1960 | Belton, Jr. et al. |
| 2,984,077 | A | 5/1961 | Gaskill |
| 2,997,514 | A | 8/1961 | Roeder, Jr. |
| 3,085,405 | A | 4/1963 | Frantti |
| 3,125,860 | A | 3/1964 | Reich |
| 3,136,577 | A | 6/1964 | Richard |
| 3,137,142 | A | 6/1964 | Venema |
| 3,138,934 | A | 6/1964 | Roane |
| 3,196,620 | A | 7/1965 | Elfving et al. |
| 3,212,275 | A | 10/1965 | Tillman, Jr. |
| 3,213,630 | A | 10/1965 | Mole |
| 3,236,056 | A | 2/1966 | Phillips et al. |
| 3,252,504 | A | 5/1966 | Newton |
| 3,391,727 | A | 7/1968 | Topouszian |
| 3,527,621 | A | 9/1970 | Newton |
| 3,561,224 | A | 2/1971 | Hampden et al. |
| 3,599,437 | A | 8/1971 | Panas |
| 3,635,037 | A | 1/1972 | Hubert |
| 3,681,929 | A | 8/1972 | Schering |
| 3,779,307 | A | 12/1973 | Weiss et al. |
| 3,817,043 | A | 6/1974 | Zoleta |
| 3,885,126 | A | 5/1975 | Sugiyama et al. |
| 4,038,831 | A | 8/1977 | Gaudel et al. |
| 4,051,691 | A | 10/1977 | Dawkins |
| 4,065,936 | A | 1/1978 | Fenton et al. |
| 4,193,271 | A | 3/1980 | Honigsbaum |
| 4,229,687 | A | 10/1980 | Newman |
| 4,280,330 | A | 7/1981 | Harris et al. |
| 4,314,008 | A | 2/1982 | Blake |
| 4,324,845 | A | 4/1982 | Stockel |
| 4,444,851 | A | 4/1984 | Maru |
| 4,448,157 | A | 5/1984 | Eckstein et al. |
| 4,494,380 | A | 1/1985 | Cross |
| 4,531,379 | A | 7/1985 | Diefenthaler, Jr. |
| 4,658,599 | A | 4/1987 | Kajiwara |
| 4,665,707 | A | 5/1987 | Hamilton |
| 4,665,971 | A | 5/1987 | Sakurai |
| 4,707,995 | A | 11/1987 | Assaf |
| 4,753,682 | A | 6/1988 | Cantoni |
| 4,823,554 | A | 4/1989 | Trachtenberg et al. |
| 4,848,090 | A | 7/1989 | Peters |
| 4,858,069 | A | 8/1989 | Hughes |
| 4,865,929 | A | 9/1989 | Eck |
| 4,905,475 | A | 3/1990 | Tuomi |
| 4,907,060 | A | 3/1990 | Nelson et al. |
| 4,922,721 | A | 5/1990 | Robertson et al. |
| 4,922,998 | A | 5/1990 | Carr |
| 4,947,735 | A | 8/1990 | Guillemin |
| 4,988,847 | A | 1/1991 | Argos et al. |
| 4,999,576 | A | 3/1991 | Levinson |
| 5,015,545 | A | 5/1991 | Brooks |
| 5,029,446 | A | 7/1991 | Suzuki |
| 5,038,569 | A | 8/1991 | Shirota et al. |
| 5,042,566 | A | 8/1991 | Hildebrand |
| 5,071,652 | A | 12/1991 | Jones et al. |
| 5,092,129 | A | 3/1992 | Bayes et al. |
| 5,097,829 | A | 3/1992 | Quisenberry |
| 5,111,664 | A | 5/1992 | Yang |
| 5,119,640 | A | 6/1992 | Conrad |
| 5,121,047 | A | 6/1992 | Goedken et al. |
| 5,141,826 | A | 8/1992 | Böhm et al. |
| 5,167,129 | A | 12/1992 | Akasaka |
| 5,193,347 | A | 3/1993 | Apisdorf |
| 5,197,291 | A | 3/1993 | Levinson |
| 5,198,930 | A | 3/1993 | Muratomi |
| 5,229,702 | A | 7/1993 | Boehling et al. |
| 5,232,516 | A | 8/1993 | Hed |
| 5,269,146 | A | 12/1993 | Kerner |
| 5,291,960 | A | 3/1994 | Brandenburg et al. |
| 5,300,197 | A | 4/1994 | Mitani et al. |
| 5,303,771 | A | 4/1994 | Des Champs |
| 5,316,078 | A | 5/1994 | Cesaroni |
| 5,385,020 | A | 1/1995 | Gwilliam et al. |
| 5,386,823 | A | 2/1995 | Chen |
| 5,395,708 | A | 3/1995 | Hall |
| 5,407,130 | A | 4/1995 | Uyeki et al. |
| 5,419,980 | A | 5/1995 | Okamoto et al. |
| 5,431,021 | A | 7/1995 | Gwilliam et al. |
| 5,448,891 | A | 9/1995 | Nakagiri et al. |
| 5,450,894 | A | 9/1995 | Inoue et al. |
| 5,483,807 | A | 1/1996 | Abersfelder et al. |
| 5,497,625 | A | 3/1996 | Manz et al. |
| 5,499,504 | A | 3/1996 | Mill et al. |
| 5,549,153 | A | 8/1996 | Baruschke et al. |
| 5,576,512 | A * | 11/1996 | Doke ............................ 136/203 |
| 5,592,363 | A | 1/1997 | Atarashi et al. |
| 5,605,047 | A | 2/1997 | Park et al. |
| 5,623,195 | A | 4/1997 | Bullock et al. |
| 5,653,111 | A | 8/1997 | Attey et al. |
| 5,673,964 | A | 10/1997 | Roan et al. |
| 5,694,770 | A | 12/1997 | Bruck et al. |
| 5,705,770 | A * | 1/1998 | Ogasawara et al. ........... 136/205 |
| 5,722,249 | A | 3/1998 | Miller, Jr. |
| 5,724,818 | A | 3/1998 | Iwata et al. |
| 5,725,048 | A | 3/1998 | Burk et al. |
| 5,802,856 | A | 9/1998 | Schaper et al. |
| 5,816,236 | A | 10/1998 | Moroi et al. |
| 5,871,859 | A | 2/1999 | Parise |
| 5,890,371 | A | 4/1999 | Rajasubramanian et al. |
| 5,899,086 | A | 5/1999 | Noda et al. |
| 5,901,572 | A | 5/1999 | Peiffer et al. |
| RE36,242 | E | 6/1999 | Apisdorf |
| 5,918,930 | A | 7/1999 | Kawai et al. |
| 5,921,088 | A | 7/1999 | Imaizumi et al. |
| 5,955,772 | A | 9/1999 | Shakouri et al. |
| 5,964,092 | A | 10/1999 | Tozuka et al. |
| 5,966,941 | A | 10/1999 | Ghoshal |
| 5,975,856 | A | 11/1999 | Welle |
| 5,977,785 | A | 11/1999 | Burward-Hoy |
| 5,987,890 | A | 11/1999 | Chiu et al. |
| 6,028,263 | A | 2/2000 | Kobayashi et al. |
| 6,050,326 | A | 4/2000 | Evans |
| 6,057,050 | A | 5/2000 | Parise |
| 6,059,198 | A | 5/2000 | Moroi et al. |
| 6,082,445 | A | 7/2000 | Dugan |
| 6,084,172 | A | 7/2000 | Kishi et al. |
| 6,105,659 | A | 8/2000 | Pocol et al. |
| 6,119,463 | A * | 9/2000 | Bell .................................. 62/3.7 |
| 6,138,466 | A | 10/2000 | Lake et al. |
| 6,138,749 | A | 10/2000 | Kawai et al. |
| 6,158,225 | A | 12/2000 | Muto et al. |
| 6,205,802 | B1 | 3/2001 | Drucker et al. |
| 6,205,805 | B1 | 3/2001 | Takahashi et al. |
| 6,213,198 | B1 | 4/2001 | Shikata et al. |
| 6,223,539 | B1 | 5/2001 | Bell |
| 6,282,907 | B1 | 9/2001 | Ghoshal |
| 6,293,107 | B1 | 9/2001 | Kitagawa |
| 6,294,721 | B1 * | 9/2001 | Oravetz et al. ................ 136/242 |
| 6,320,280 | B1 | 11/2001 | Kanesaka |
| 6,324,860 | B1 | 12/2001 | Maeda et al. |
| 6,334,311 | B1 | 1/2002 | Kim et al. |
| 6,346,668 | B1 | 2/2002 | McGrew |
| 6,347,521 | B1 | 2/2002 | Kadotani et al. |
| 6,366,832 | B2 | 4/2002 | Lomonaco et al. |
| 6,393,842 | B2 | 5/2002 | Kim |
| 6,401,462 | B1 | 6/2002 | Bielinski |
| 6,412,287 | B1 | 7/2002 | Hughes et al. |
| 6,438,964 | B1 | 8/2002 | Giblin |
| 6,455,186 | B1 | 9/2002 | Moores, Jr. et al. |

(56) References Cited

U.S. PATENT DOCUMENTS

| | | | |
|---|---|---|---|
| 6,457,324 B2 | 10/2002 | Zeigler et al. |
| 6,464,027 B1 | 10/2002 | Dage et al. |
| 6,474,073 B1 | 11/2002 | Uetsuji et al. |
| 6,474,081 B1 | 11/2002 | Feuerecker |
| 6,481,213 B2 | 11/2002 | Carr et al. |
| 6,510,696 B2 | 1/2003 | Guttman et al. |
| 6,530,231 B1 | 3/2003 | Nagy et al. |
| 6,530,920 B1 | 3/2003 | Whitcroft et al. |
| 6,539,729 B2 | 4/2003 | Tupis et al. |
| 6,560,968 B2 | 5/2003 | Ko |
| 6,569,550 B2 | 5/2003 | Khelifa |
| 6,570,362 B1 | 5/2003 | Estes et al. |
| RE38,128 E | 6/2003 | Gallup et al. |
| 6,588,217 B2 | 7/2003 | Ghoshal |
| 6,598,403 B1 | 7/2003 | Ghoshal |
| 6,606,877 B2 | 8/2003 | Tomita et al. |
| 6,607,142 B1 | 8/2003 | Boggs et al. |
| 6,640,889 B1 | 11/2003 | Harte et al. |
| 6,645,666 B1 | 11/2003 | Moores, Jr. et al. |
| 6,653,002 B1 | 11/2003 | Parise |
| 6,682,844 B2 | 1/2004 | Gene |
| 6,722,139 B2 | 4/2004 | Moon et al. |
| 6,732,534 B2 | 5/2004 | Spry |
| 6,767,666 B2 | 7/2004 | Nemoto et al. |
| 6,779,348 B2 | 8/2004 | Taban |
| 6,807,811 B2 | 10/2004 | Lee |
| 6,862,892 B1 | 3/2005 | Meyer et al. |
| 6,883,602 B2 | 4/2005 | Drucker |
| 6,886,356 B2 | 5/2005 | Kubo et al. |
| 6,896,047 B2 | 5/2005 | Currle et al. |
| 6,907,739 B2 | 6/2005 | Bell |
| 6,910,345 B2 | 6/2005 | Horstmann et al. |
| 6,949,309 B2 | 9/2005 | Moores, Jr. et al. |
| 6,951,114 B2 | 10/2005 | Grisham et al. |
| 6,959,555 B2 | 11/2005 | Bell |
| 6,973,799 B2 | 12/2005 | Kuehl et al. |
| 6,986,247 B1 | 1/2006 | Parise |
| 7,007,491 B2 | 3/2006 | Grimm et al. |
| 7,014,945 B2 | 3/2006 | Moores, Jr. et al. |
| 7,056,616 B2 | 6/2006 | Moores, Jr. et al. |
| 7,061,208 B2 | 6/2006 | Nishihata et al. |
| 7,089,756 B2 | 8/2006 | Hu |
| 7,134,288 B2 | 11/2006 | Crippen et al. |
| 7,230,404 B2 | 6/2007 | Kimoto et al. |
| 7,246,496 B2 | 7/2007 | Goenka et al. |
| 7,252,904 B2 | 8/2007 | Moores, Jr. et al. |
| 7,270,910 B2 | 9/2007 | Yahnker et al. |
| 7,310,953 B2 | 12/2007 | Pham et al. |
| 7,326,490 B2 | 2/2008 | Moores, Jr. et al. |
| 7,363,766 B2 | 4/2008 | Eisenhour |
| 7,380,586 B2 | 6/2008 | Gawthrop |
| 7,384,704 B2 | 6/2008 | Scott |
| 7,426,835 B2 | 9/2008 | Bell |
| 7,743,614 B2 | 6/2010 | Goenka et al. |
| 7,784,289 B2 | 8/2010 | Scherer et al. |
| 7,788,933 B2 | 9/2010 | Goenka |
| 7,863,866 B2 | 1/2011 | Wolf |
| 7,926,293 B2 | 4/2011 | Bell |
| 8,069,674 B2 | 12/2011 | Bell |
| 8,104,294 B2 | 1/2012 | Reeve |
| 8,359,871 B2 | 1/2013 | Woods et al. |
| 8,408,012 B2 | 4/2013 | Goenka et al. |
| 8,490,412 B2 | 7/2013 | Bell et al. |
| 8,495,884 B2 | 7/2013 | Bell et al. |
| 8,613,200 B2 | 12/2013 | LaGrandeur et al. |
| 2002/0092307 A1 | 7/2002 | Ghoshal |
| 2002/0095943 A1 | 7/2002 | Hatakeyama et al. |
| 2003/0084935 A1 | 5/2003 | Bell |
| 2003/0140636 A1 | 7/2003 | Van Winkle |
| 2003/0145605 A1 | 8/2003 | Moon et al. |
| 2004/0025516 A1 | 2/2004 | Van Winkle |
| 2004/0050076 A1 | 3/2004 | Palfy et al. |
| 2004/0055312 A1 | 3/2004 | Bell |
| 2004/0093889 A1 | 5/2004 | Bureau et al. |
| 2004/0098991 A1 | 5/2004 | Heyes |
| 2004/0237541 A1 | 12/2004 | Murphy |
| 2005/0000473 A1 | 1/2005 | Ap et al. |
| 2005/0011199 A1 | 1/2005 | Grisham et al. |
| 2005/0061497 A1 | 3/2005 | Amaral |
| 2005/0067862 A1 | 3/2005 | Iqbal et al. |
| 2005/0081834 A1 | 4/2005 | Perkins |
| 2005/0133206 A1 | 6/2005 | Scott |
| 2005/0139692 A1 | 6/2005 | Yamamoto |
| 2005/0178128 A1 | 8/2005 | Harwood et al. |
| 2005/0257531 A1 | 11/2005 | Kadle et al. |
| 2005/0257545 A1 | 11/2005 | Ziehr et al. |
| 2005/0268621 A1 | 12/2005 | Kadle et al. |
| 2005/0278863 A1 | 12/2005 | Bahash et al. |
| 2006/0005548 A1 | 1/2006 | Ruckstuhl |
| 2006/0011152 A1 | 1/2006 | Hayes |
| 2006/0028182 A1 | 2/2006 | Yang et al. |
| 2006/0059933 A1 | 3/2006 | Axakov et al. |
| 2006/0060236 A1 | 3/2006 | Kim |
| 2006/0075758 A1 | 4/2006 | Rice et al. |
| 2006/0124165 A1 | 6/2006 | Bierschenk et al. |
| 2006/0130490 A1 | 6/2006 | Petrovski |
| 2006/0137358 A1 | 6/2006 | Feher |
| 2006/0150657 A1 | 7/2006 | Spurgeon et al. |
| 2006/0188418 A1 | 8/2006 | Park et al. |
| 2006/0254284 A1 | 11/2006 | Ito et al. |
| 2006/0254285 A1 | 11/2006 | Lin |
| 2007/0000255 A1 | 1/2007 | Elliot et al. |
| 2007/0017666 A1 | 1/2007 | Goenka et al. |
| 2007/0033951 A1 | 2/2007 | Goenka et al. |
| 2007/0056295 A1 | 3/2007 | De Vilbiss |
| 2007/0214799 A1 | 9/2007 | Goenka |
| 2007/0272290 A1 | 11/2007 | Sims et al. |
| 2008/0017362 A1 | 1/2008 | Kwon et al. |
| 2008/0028768 A1 | 2/2008 | Goenka |
| 2008/0090137 A1 | 4/2008 | Buck et al. |
| 2008/0230618 A1 | 9/2008 | Gawthrop |
| 2008/0239675 A1 | 10/2008 | Speier |
| 2008/0245398 A1* | 10/2008 | Bell et al. ............... 136/224 |
| 2008/0250794 A1 | 10/2008 | Bell |
| 2008/0307796 A1 | 12/2008 | Bell et al. |
| 2008/0311466 A1 | 12/2008 | Yang et al. |
| 2009/0000310 A1 | 1/2009 | Bell et al. |
| 2009/0007572 A1 | 1/2009 | Bell et al. |
| 2009/0025770 A1 | 1/2009 | Lofy |
| 2010/0031987 A1 | 2/2010 | Bell |
| 2010/0052374 A1 | 3/2010 | Bell et al. |
| 2010/0101238 A1 | 4/2010 | LaGrandeur et al. |
| 2010/0101239 A1 | 4/2010 | LaGrandeur et al. |
| 2010/0112419 A1 | 5/2010 | Jang et al. |
| 2010/0155018 A1 | 6/2010 | Goenka et al. |
| 2010/0287952 A1 | 11/2010 | Goenka |
| 2010/0313576 A1 | 12/2010 | Goenka |
| 2011/0079023 A1 | 4/2011 | Goenka et al. |
| 2011/0107773 A1 | 5/2011 | Gawthrop |
| 2011/0236731 A1 | 9/2011 | Bell et al. |
| 2011/0244300 A1 | 10/2011 | Closek et al. |
| 2011/0287285 A1 | 11/2011 | Yoon |
| 2012/0266608 A1 | 10/2012 | Kadle et al. |
| 2012/0285758 A1 | 11/2012 | Bell et al. |
| 2013/0059190 A1 | 3/2013 | Kossakovski et al. |
| 2013/0174579 A1 | 7/2013 | Goenka et al. |
| 2013/0183566 A1 | 7/2013 | Wayne et al. |
| 2013/0192271 A1 | 8/2013 | Ranalli et al. |
| 2013/0192272 A1 | 8/2013 | Ranalli et al. |
| 2013/0216887 A1 | 8/2013 | Wayne et al. |
| 2013/0317728 A1 | 11/2013 | Hall et al. |
| 2013/0327063 A1 | 12/2013 | Gawthrop |
| 2014/0060086 A1 | 3/2014 | Ranalli et al. |

FOREIGN PATENT DOCUMENTS

| | | |
|---|---|---|
| DE | 2319155 | 10/1974 |
| DE | 197 30 678 | 1/1999 |
| DE | 19829440 | 1/2000 |
| DE | 199 51 224 | 5/2001 |
| DE | 20105487 U1 * | 10/2001 |
| DE | 102009003737 | 10/2010 |
| EP | 0 389 407 | 9/1990 |
| EP | 0 545 021 | 6/1993 |

(56) References Cited

FOREIGN PATENT DOCUMENTS

| | | |
|---|---|---|
| EP | 0 791 497 | 8/1997 |
| EP | 1641067 A1 | 3/2006 |
| EP | 1 932 695 A1 | 6/2008 |
| FR | 2806666 | 9/2001 |
| FR | 2903057 | 1/2008 |
| GB | 231 192 A | 5/1926 |
| GB | 1 040 485 | 8/1966 |
| GB | 2 267 338 | 12/1993 |
| GB | 2 333 352 | 7/1999 |
| JP | 39-27735 | 12/1964 |
| JP | 56-18231 | 2/1981 |
| JP | 01 131830 A | 5/1989 |
| JP | 01 200122 | 8/1989 |
| JP | 01 281344 | 11/1989 |
| JP | 04 103925 | 4/1992 |
| JP | 4-165234 | 6/1992 |
| JP | 05-37521 | 5/1993 |
| JP | 6-024235 | 2/1994 |
| JP | 06089955 A * | 3/1994 |
| JP | 06-135218 | 5/1994 |
| JP | 07-089334 | 4/1995 |
| JP | 07-54189 | 6/1995 |
| JP | 07-253224 | 10/1995 |
| JP | 08-316388 | 11/1996 |
| JP | 09042801 | 2/1997 |
| JP | 09-254630 | 9/1997 |
| JP | 9-276076 | 10/1997 |
| JP | 10035268 | 2/1998 |
| JP | 11-042933 | 2/1999 |
| JP | 11-301254 | 11/1999 |
| JP | 11-342731 | 12/1999 |
| JP | 2000130883 A * | 5/2000 |
| JP | 2000-161721 | 6/2000 |
| JP | 2000-274788 | 10/2000 |
| JP | 2000-274871 A | 10/2000 |
| JP | 2000-274874 | 10/2000 |
| JP | 2000-318434 | 11/2000 |
| JP | 2002-13758 | 1/2002 |
| JP | 2002059736 A | 2/2002 |
| JP | 2003-237357 | 8/2003 |
| JP | 2004 050874 | 2/2004 |
| JP | 2005 212564 | 8/2005 |
| JP | 2005-302851 | 10/2005 |
| JP | 2006 015965 | 1/2006 |
| JP | 2007-161110 | 6/2007 |
| JP | 2008-047371 | 2/2008 |
| JP | 2008-094366 | 4/2008 |
| JP | 2008-108509 | 5/2008 |
| JP | 2009-245730 | 10/2009 |
| KR | 2001 111646 | 12/2001 |
| KR | 10-2002-0057600 | 7/2002 |
| KR | 10-2011-0013876 | 2/2011 |
| LU | 66619 | 2/1973 |
| SE | 337 227 | 5/1971 |
| SU | 184886 A | 7/1966 |
| WO | WO 95/01500 | 1/1995 |
| WO | WO 96/05475 | 2/1996 |
| WO | WO 97/47930 | 12/1997 |
| WO | WO 99/09360 | 2/1999 |
| WO | WO 99/10191 | 3/1999 |
| WO | WO 99/58907 | 11/1999 |
| WO | WO 02/00458 | 1/2002 |
| WO | WO 03/014634 | 2/2003 |
| WO | WO 2005/023571 | 3/2005 |
| WO | WO 2006/037178 A | 4/2006 |
| WO | WO 2006/064432 | 6/2006 |
| WO | WO 2007/001289 | 1/2007 |
| WO | WO 2008/123663 | 10/2008 |
| WO | WO 2008/147305 | 12/2008 |
| WO | WO 2014/110524 | 1/2014 |
| WO | WO 2014/120688 | 8/2014 |

OTHER PUBLICATIONS

Machine translation of DE 20105487 U1, Oct. 2001.*
Yamamoto, T., Machine translation of JP 2000-130883 A, May 2000.*
Lofy, John et al., "Thermoelectrics for Environmental Control Automobiles," 21st International Conference on Thermoelectronics, 2002, p. 471-476.
International Search Report and Written Opinion for co-pending International Application No. PCT/US2010/035321 mailed Dec. 23, 2010 in 17 pages.
International Preliminary Report on Patentablility for co-pending International Application No. PCT/US2010/035321 mailed Nov. 22, 2011 in 10 pages.
U.S. Appl. No. 14/158,342, filed Jan. 17, 2014, Bell et al.
Behr, "Li-on Battery Cooling", Power Point Presentation, Stuttgart, May 20, 2009, 13 pages.
Behr, "Thermal Management for Hybrid Vehicles," Power Point Presentation, Technical Press Day 2009, 20 pages.
Esfahanian, Vahid et al., "Design and Simulation of Air Cooled Battery Thermal Management System Using Thermoelectric for a Hybrid Electric Bus", Proceedings of the FISITA 2012 World Automotive Congress, vol. 3, Lecture notes in Electrical Engineering, vol. 191, 2013.
Heckenberger, Thomas, "Li-on Battery Cooling," BEHR Power Point Presentation, Technical Press Day, Stuttgart, May 20, 2009, 13 pages.
Horie, et al., "A Study on an Advanced Lithium-ion Battery System for EVs", The World Electric Vechical Journal, 2008, vol. 2, Issue 2, pp. 25-31.
Jeon et al., "Development of Battery Pack Design for High Power Li-Ion Battery Pack of HEV", The World Electric Vechical Association Journal, 2007, vol. 1, pp. 94-99.
Jeon, et al., "Thermal modeling of cylindrical lithium ion battery during discharge cycle," Energy Conversion and Management, Aug. 2011, vol. 52, Issues 8-9, pp. 2973-2981.
Morawietz, et al., "Thermoelektrische Modellierung eines Lithium-Lonen-Energiespeichers fuer den Fahzeugeinsatz," VDI-Berichte, Nov. 2008, Issue 2030, pp. 299-318.
Sabbah et al., "Passive Thermal Management System for Plug-in Hybrid and Comparison with Active Cooling: Limitation of Temperature Rise and Uniformity of Temperature Distribution", ECS Transaction, 2008, vol. 13, Issue 19, pp. 41-52.

* cited by examiner

BATTERY THERMAL MANAGEMENT SYSTEM INCLUDING THERMOELECTRIC ASSEMBLIES IN THERMAL COMMUNICATION WITH A BATTERY

CROSS-REFERENCE TO RELATED APPLICATIONS

This application claims the benefit of U.S. Provisional Application No. 61/179,326 filed May 18, 2009, which is incorporated herein in its entirety by reference.

BACKGROUND

1. Field of the Invention

The present application relates to battery thermal management systems and thermoelectric cooling and heating batteries.

2. Description of the Related Art

High performance batteries for use in large systems (including, for example, lithium based batteries used in electrical vehicles) have certain properties that make thermal management of the batteries and/or containment system desirable. Charging characteristics of high performance batteries change at elevated temperatures and can cause the cycle life of the batteries to decrease significantly if they are charged at too high of a temperature. For example, the cycle life of some lithium based batteries decreased by over 50% if they are repeatedly charged at about 50° C. Since cycle life can be reduced by a large amount, the lifetime cost of batteries can be greatly increased if charging temperatures are not controlled within proper limits. Also, some high performance batteries can exhibit reduced performance and can be possibly damaged if charged or operated at too low of temperatures, such as below about −30° C. Furthermore, high performance batteries and arrays of high performance batteries can experience thermal events from which the batteries can be permanently damaged or destroyed, and over temperature condition can even result in fires and other safety related events.

SUMMARY

In certain embodiments, a battery thermal management system is provided. The battery thermal management system can include at least one battery and a plurality of thermoelectric assemblies in thermal communication with the at least one battery. Each thermoelectric assembly can include a plurality of thermoelectric elements, and a first thermoelectric assembly of the plurality of thermoelectric assemblies is in electrical communication with a second thermoelectric assembly of the plurality of thermoelectric assemblies. The battery thermal management system can also include a circuit in electrical communication with the first thermoelectric assembly and the second thermoelectric assembly. The circuit can be configured to be selectively switchable to place the first thermoelectric assembly and the second thermoelectric assembly either in series electrical communication or parallel electrical communication with one another.

In some embodiments, the at least some of the plurality of thermoelectric elements of the first thermoelectric assembly are in series electrical communication with one another and at least some of the plurality of thermoelectric elements of the second thermoelectric assembly are in series electrical communication with one another. In further embodiments, the plurality of thermoelectric assemblies are selectively operable to either heat or cool the at least one battery.

In certain embodiments, a method of thermally managing a battery system includes providing a battery system comprising at least one battery and a plurality of thermoelectric assemblies in thermal communication with the at least one battery. The method can further include measuring at least one parameter of the battery system and switching, in response to the at least one parameter, a first thermoelectric assembly of the plurality of thermoelectric assemblies between being in parallel or in series electrical communication with a second thermoelectric assembly of the plurality of thermoelectric assemblies. In some embodiments the at least one parameter is a temperature of the at least one battery and/or a temperature of the plurality of thermoelectric assemblies.

In certain embodiments, a battery thermal management system includes at least one battery, at least one thermoelectric device in thermal communication with the at least one battery, and at least one first conduit comprising at least one inlet configured to allow a first working fluid to enter and flow into the at least one first conduit and into thermal communication with the at least one thermoelectric device. The at least one first conduit further comprises at least one outlet configured to allow the first working fluid to exit and flow from the at least one first conduit and away from being in thermal communication with the at least one thermoelectric device. The battery thermal management system can further include at least one first flow control device which directs the first working fluid through the at least one inlet of the at least one first conduit and at least one second flow control device which directs the first working fluid through the at least one outlet of the at least one first conduit. The at least one first flow control device and the at least one second flow control device are each separately operable from one another.

In some embodiments, the at least one second conduit comprises at least one inlet configured to allow a second working fluid to enter and flow into the at least one second conduit and into thermal communication with the at least one thermoelectric device. The at least one second conduit comprises at least one outlet configured to allow the second working fluid to exit and flow from the at least one second conduit and away from being in thermal communication with the at least one thermoelectric device. The battery thermal management system can also include at least one third flow control device which directs the second working fluid through the at least one inlet of the at least one second conduit and at least one fourth flow control device which directs the second working fluid through the at least one outlet of the at least one second conduit. The at least third first flow control device and the at least one fourth flow control device can each be separately operable from one another.

In certain embodiments, a method of thermally managing a battery system includes transferring heat between at least one battery and at least one thermoelectric device, and flowing a working fluid through a fluid conduit in thermal communication with the at least one thermoelectric device. The method can also include operating at least one first flow control device to direct the working fluid to be in thermal communication with the at least one thermoelectric device, and operating at least one second flow control device separately from the operating of the at least one first flow control device to direct the working fluid away from being in thermal communication with the at least one thermoelectric device.

In certain embodiments, a battery thermal management system includes at least one battery, at least one thermoelectric device in thermal communication with the at least one battery, and at least one fluid conduit configured to allow a working fluid to flow therein and to transfer the working fluid into being in thermal communication with the at least one thermoelectric device or away from being in thermal communication with the at least one thermoelectric device. The battery thermal management system can further include at least one first flow control device which directs the working fluid through the at least one fluid conduit and at least one second flow control device which directs the working fluid through the at least one fluid conduit. The at least one first flow control device and the at least one second flow control device are each separately operable from one another. The battery thermal management system can also include at least one divider portion that is selectively positionable to block the working fluid from flowing between the at least one fluid conduit and a selected one of the at least one first flow control device and the at least one second flow control device.

In certain embodiments, a method of thermally managing a battery system includes transferring heat between at least one battery and at least one thermoelectric device, and flowing a working fluid through a fluid conduit in thermal communication with at least one thermoelectric device. The method can further include directing the working fluid through the fluid conduit using at least one first flow control device and at least one second flow control device, and selectively inhibiting flow of the working fluid through a selected one of the at least one first flow control device and the at least one second flow control device.

In certain embodiments, a method of thermally managing a battery system includes providing a battery system comprising at least one battery and a plurality of thermoelectric devices in thermal communication with the at least one battery. The plurality of thermoelectric devices comprise a first group of one or more thermoelectric devices in series electrical communication with a second group of one or more thermoelectric devices. The method can further include measuring a first electrical voltage or current of the first group, measuring a second electrical voltage or current of the second group or of both the first group and the second group together, and monitoring an electrical comparison parameter dependent on the first electrical voltage or current and the second electrical voltage or current.

DETAILED DESCRIPTION

Battery thermal management systems (BTMS) can be used to control temperatures and monitor conditions of batteries and arrays of batteries to prevent battery failure and/or safety related failure. A BTMS can improve the overall conditions of battery operation by both managing the thermal environment and also being sufficiently reliable so that overall system performance is not degraded. For example, a BTMS may not reduce overall system reliability and not increase system operating cost by not including significant additional possible failure mechanisms to the system. Furthermore, the systems can be environmentally friendly and not contain materials that emit greenhouse gases such as refrigerants.

A BTMS includes at least one battery or battery array. In certain embodiments, a battery thermal management system can be used to both heat and cool batteries and/or battery arrays. For example, the battery thermal management system can be integrated with the at least one battery, the battery thermal management system can be integrated with an enclosure wherein the at least one battery is contained, or the thermal management system can be positioned in thermal communication with the at least one battery.

In certain embodiments, a battery thermal management system includes one or more thermoelectric (TE) devices. For example, the battery thermal management system can include a plurality of thermoelectric elements, at least one thermoelectric assembly, and/or at least one thermoelectric module. TE devices are solid state and do not utilize refrigerants to produce cooling, and some TE devices can produce both heating and cooling. Furthermore, battery thermal management systems can include a plurality of TE devices which can be configured to increase reliability over that of a conventional two phase refrigerant system, such as one employing refrigerant 134A.

A variety of embodiments of battery thermal management systems are described below to illustrate various configurations. The particular embodiments and examples are only illustrative and features described in one embodiment or example may be combined with other features described in other embodiments or examples. Accordingly, the particular embodiments and examples are not intended to be restrictive in any way.

Figure 1:
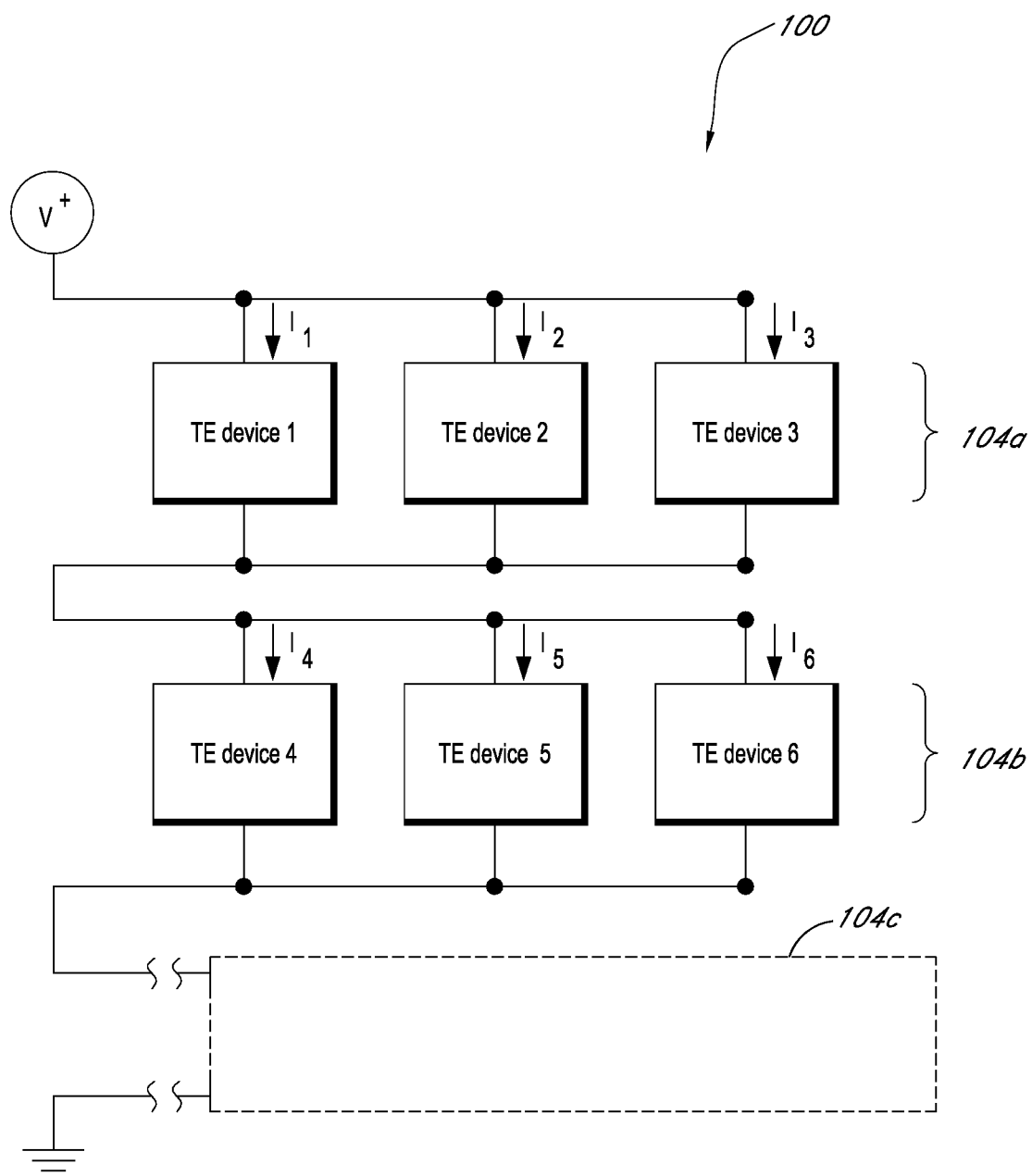
FIG. 1 is a schematic circuit diagram of an example thermal management system including a plurality of TE devices in accordance with certain embodiments described herein.

Battery Thermal Management Systems with Improved Thermoelectric Device Reliability In certain embodiments, a battery thermal management system 100 includes at least one battery and a plurality of thermoelectric devices in thermal communication with the at least one battery. FIG. 1 is a schematic circuit diagram of an example thermal management system 100 comprising a plurality of TE devices in accordance with certain embodiments described herein. The TE devices can be TE elements, TE assemblies, and/or TE modules. The plurality of TE devices includes a first group 104a of TE devices and a second group 104b of TE devices. The TE devices of the first TE group 104a are in parallel electrical communication with one another, and the TE devices of the second TE group 104b are in parallel electrical communication with one another. In particular, TE device 1, TE device 2, and TE device 3 are in parallel electrical communication with one another and TE device 4, TE device 5, and TE device 6 are in parallel electrical communication with one another. The first TE group 104a and the second TE group 104b are in series electrical communication with one another. One or more additional TE groups 104c can also be placed in series electrical communication with the first TE group 104a and the second TE group 104b.

The battery thermal management system 100 can improve overall system cooling and heating reliability. First, the TE devices are configured so as to allow redundancy and eliminate common single point failure mechanisms within each TE group. For example, if TE device 1 fails open such that the TE device 1 is electrically open (e.g., the TE device is unable to pass electrical current), the current is rerouted through TE device 2 and TE device 3 which are electrically connected in parallel with the failed TE device 1. If three or more TE devices are electrically connected together in parallel, more than one TE device could fail open, and the thermal management system 100 would still operate to provide cooling and/or heating.

In a further example, if TE device 1 fails closed (e.g., the TE device 1 is more electrically conductive than TE device 2 and TE device 3), more of the electrical current will flow through the failed TE device 1 than TE device 2 and TE device 3, and reduce or eliminate the cooling and/or heating of the TE device 2 and TE device 3 in the same parallel electrical connection. The TE group 2 that is in series electrical communication with TE group 1 will continue to function and provide heating and/or cooling. Failure of a TE device will degrade performance, but with sufficient numbers of TE devices, and the proper operating conditions, the thermal management system 100 can continue to function, albeit at a reduced heating and/or cooling capability if a TE device fails. In arrays larger than illustrated in FIG. 1, performance of a thermal management system 100 with one or more failed TE devices can be substantially the same as that of a thermal management system 100 without any failed TE devices. Further examples of TE device redundancy are described in U.S. Patent Publication No. 2010/0031987, which is incorporated herein in its entirety by reference.

Figure 2:
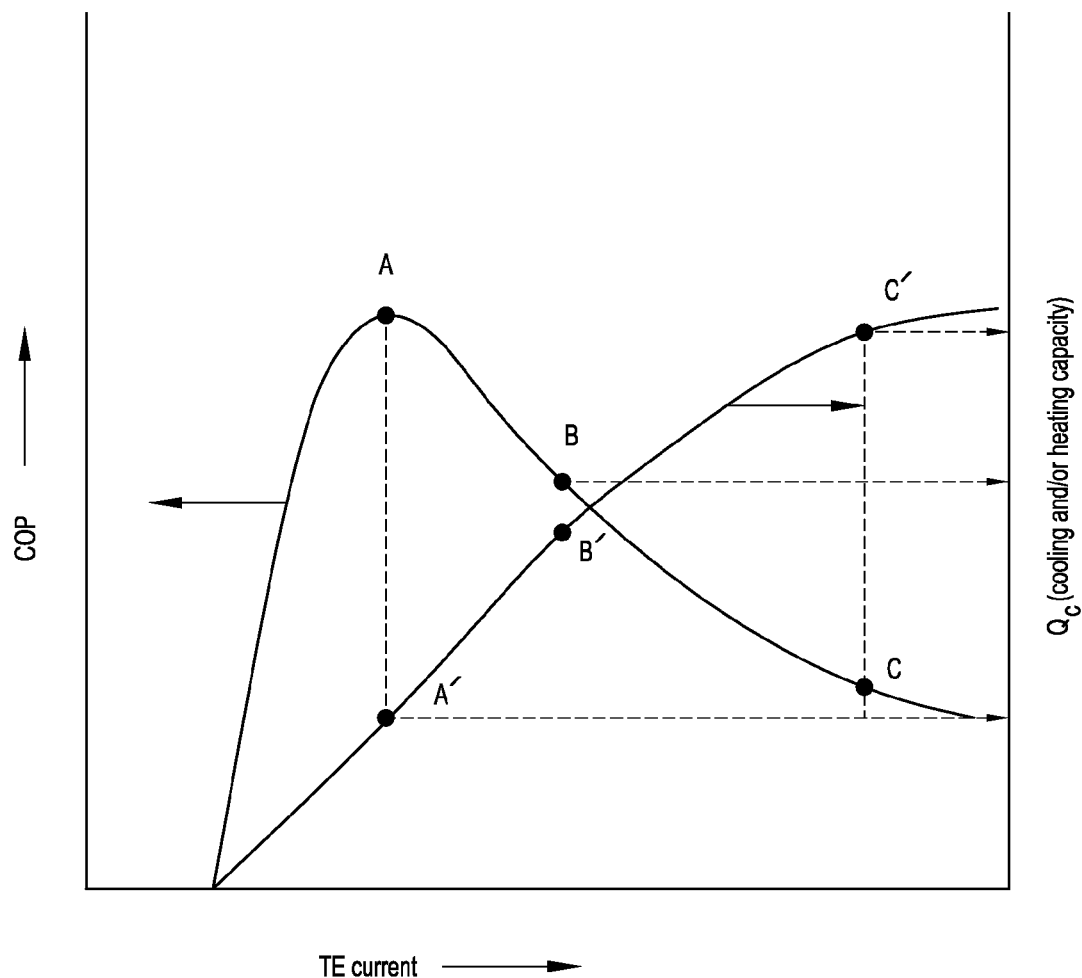
FIG. 2 is an illustrative plot of operating electrical current as a function of the efficiency of energy conversion (COP) and the total thermal output of a TE device.

FIG. 2 is a illustrative plot of operating electrical current as a function of the efficiency of energy conversion (COP) and the total thermal output of a TE device ($Q_c$). Points A and A' are near the operating current that optimizes operating efficiency of the TE device (indicated by Point A) so that it will operate near its peak possible efficiency. Points B and B' are a second operating current that is at 1.5 times the operating current of Points A and A', and Points C and C' are at a third operating current 3 times the operating current of Points A and A'. The dashed lines in FIG. 2 illustrate positions of the points relative to each other and relative to the x and y axes. If the TE device operates under a lower temperature differential, efficiency will be lower at Points B, B', C, and C', but cooling and/or heating power will be diminished by a relatively small amount so that cooling and/or heating power will remain nearly the same. Furthermore, a TE device can have a thermal output beyond peak operating efficiency by increasing electrical power even though efficiency may decrease.

Figure 3:
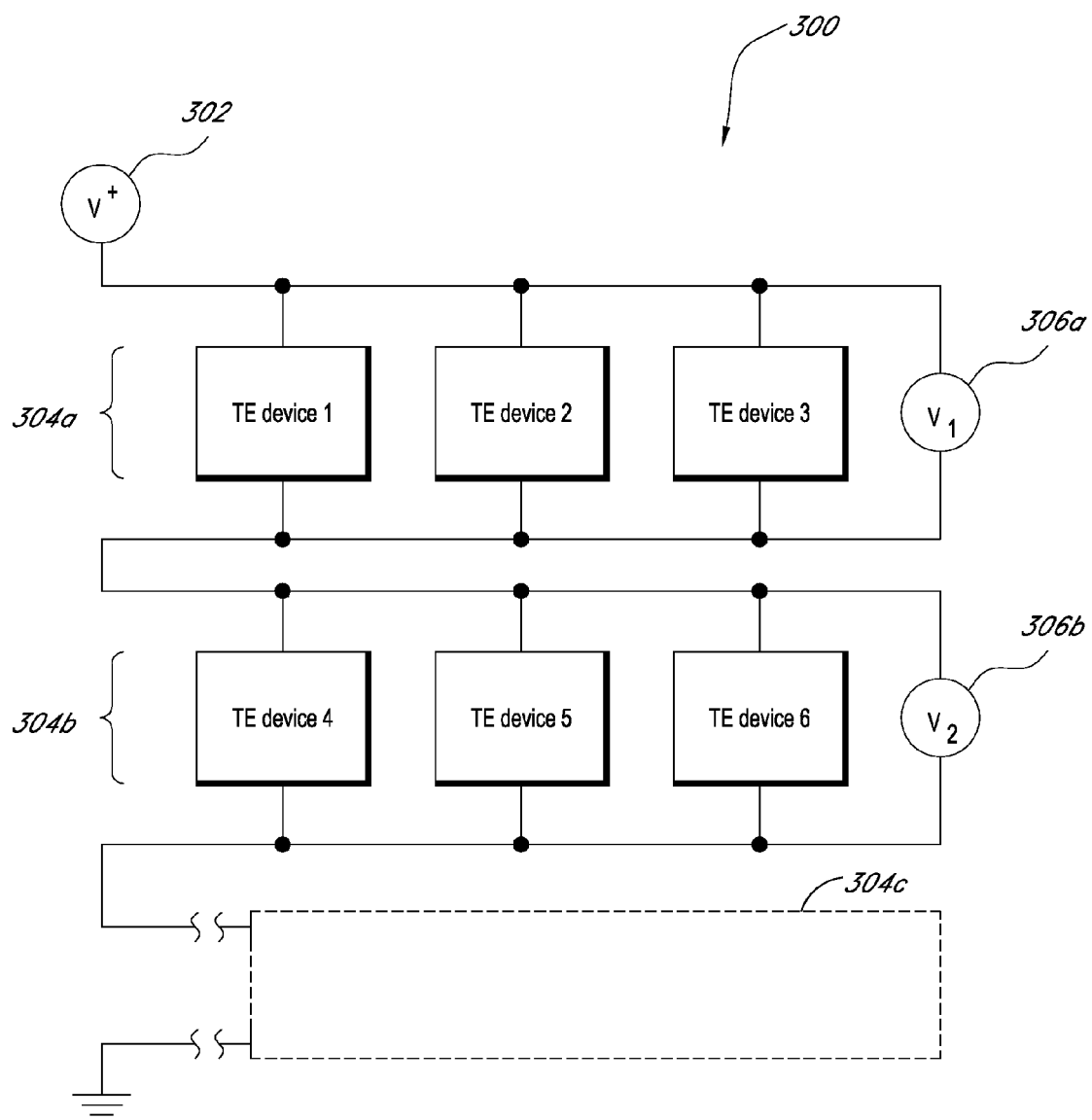
FIG. 3 is a schematic circuit diagram of an example thermal management system including a plurality of TE devices and voltage meters in accordance with certain embodiments described herein.

The change in the operating circuit induced by failure of one or more TE devices can result in a different current-voltage relationship of a battery thermal management system 300. Thus, for example if one or more TE devices fail, and if current to the battery thermal management system 300 is fixed, a voltage change will be induced, and vice versa, if voltage is fixed, a current change will be induced. FIG. 3 is a schematic circuit diagram of an example thermal management system 300 that includes a plurality of TE devices in accordance with certain embodiments described herein. The thermal management system 300 in FIG. 3 also illustrates an example monitoring method to detect failure of a TE device. Diagnosing failure in a TE device of a thermal management system 300 can be measured through monitoring voltages and/or currents of the battery thermal management system 300, either under transient or quasi-steady state conditions. Many other monitoring methods are also possible.

The electrical configuration of the TE devices of the battery thermal management system 300 illustrated in FIG. 3 is similar to that illustrated in FIG. 1. The battery thermal management system 300 includes a plurality of TE devices includes a first TE group 304a and a second TE group 304b. The TE devices of the first TE group 304a are in parallel electrical communication with one another, and the TE devices of the second TE group 304b are in parallel electrical communication with one another. In particular, TE device 1, TE device 2, and TE device 3 are in parallel electrical communication with one another and TE device 4, TE device 5, and TE device 6 are in parallel electrical communication with one another. The first TE group 304a and the second TE group 304b are in series electrical communication with one another. One or more additional TE groups 304c can also be placed in series electrical communication with the first TE group 304a and the second TE group 304b.

In certain embodiments, a method of thermally managing a battery thermal management system 300 includes providing a battery system comprising at least one battery and a plurality of thermoelectric devices in thermal communication with the at least one battery. The plurality of thermoelectric devices includes a first group 304a of thermoelectric devices in series electrical communication with a second group 304b of thermoelectric devices. The method includes measuring a first electrical voltage or current of the first group 304a and measuring a second electrical voltage or current of the second group 304b or both the first group 304a and second group 304b together. The method further includes monitoring an electrical comparison parameter dependent on the first electrical voltage or current and the second electrical voltage or current. In some embodiments, the electrical comparison parameter comprises a value of the first electrical voltage or current divided by the second electrical voltage or current. In further embodiments, the method further includes changing, in response to the electrical comparison parameter, at least one parameter of the battery system. The at least one parameter can be, for example, electrical power supplied to the plurality of thermoelectric devices.

The thermal management system 300 can include two or more voltage and/or current meters for measuring the electrical voltage or current. For example, a first meter 306a can measure a first voltage and/or current ($V_1$) across the first group 304a, and a second meter 306b can measure a second voltage and/or current ($V_2$) across the second group 304b. A system meter 302 can measure a system voltage and/or current ($V^+$) across the first TE group 304a, the second group 304b, and the one or more additional TE groups 304c. The ratio of $V_1/V_2$, $V_1/V^+$, or $V_2/V^+$ will change if one or more TE devices fail. Furthermore, even if the system voltage or current ($V+$) changes, the ratios $V_1/V_2$, $V_1/V^+$, and $V_2/V^+$ would remain constant if one or more TE devices does not fail. Therefore, by monitoring $V_1$ and $V_2$ or $V^+$, a failure of a TE device can be detected.

Figure 4A:
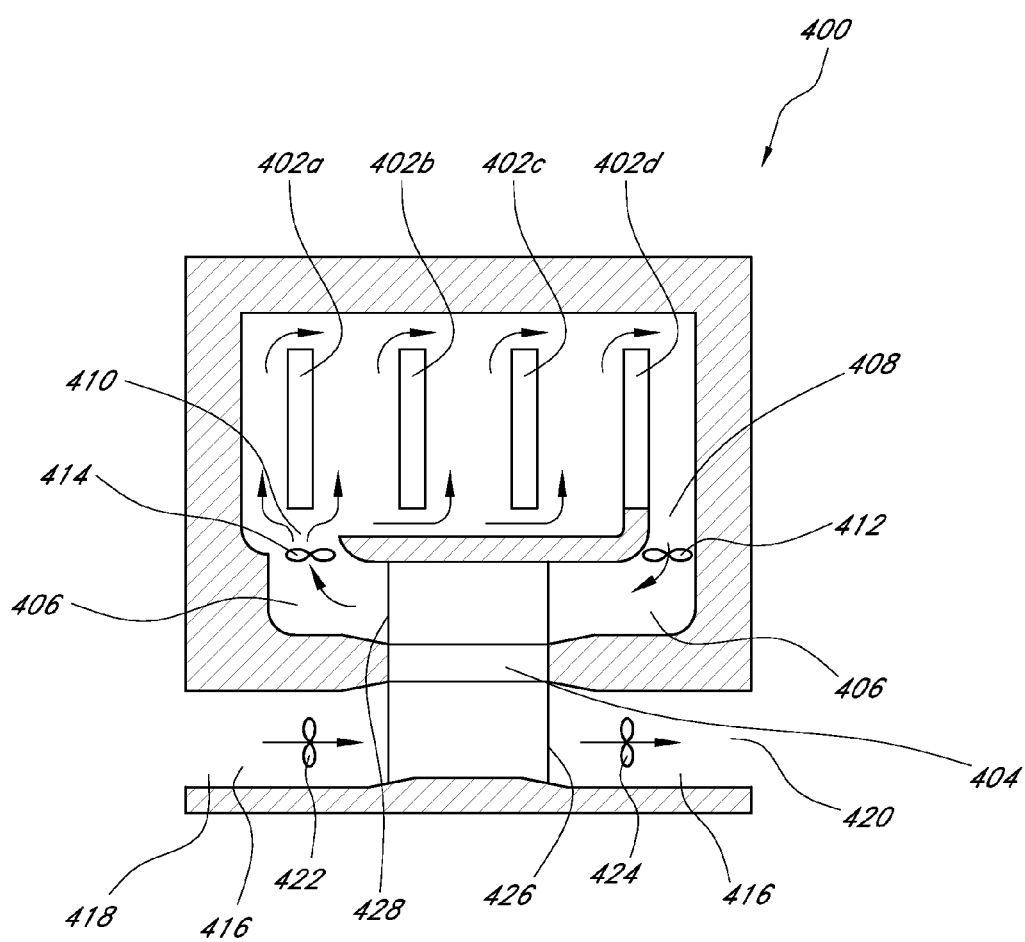
FIG. 4A is an example thermal management system illustrating flow of a working fluid with flow control devices in series in accordance with certain embodiments described herein.

Battery Thermal Management System with Improved Working Fluid Flow and Electronics Reliability Other possible failure modes include those associated with a fluid cooling/heating system. For example, if more than one flow control device (e.g., fan or pump) is used to move a working fluid, reliability can be increase over use of a single flow control device. FIG. 4A illustrates an example battery thermal management system 400 in accordance with certain embodiments described herein. In certain embodiments, a battery thermal management system 400 includes at least one battery 402a-d and at least one thermoelectric device 404 in thermal communication with the at least one battery 402a-d.

The battery thermal management system 400 can include at least one first fluid conduit 406 that includes at least one inlet 408 configured to allow a first working fluid to enter and flow into the at least one first fluid conduit 406 and into thermal communication with the at least one thermoelectric device 404. For example, a heat exchanger 428 can transfer heat between the at least one thermoelectric device 404 and the first working fluid. The at least one first fluid conduit 406 also includes at least one outlet 410 configured to allow the first working fluid to exit and flow from the at least one first fluid conduit 406 and away from being in thermal communication with the at least one thermoelectric device 404. The battery thermal management system 400 can further include at least one first flow control device 412 which directs the first working fluid through the at least one inlet 408 of the at least one first fluid conduit 406, and at least one second flow control device 414 which directs the first working fluid through the at least one outlet 410 of the at least one first fluid conduit 406. The at least one first flow control device 412 and the at least one second flow control device 414 are each separately operable from one another. In certain embodiments, the at least one first flow control device 412 pushes the first working fluid while the at least one second flow control device 414 pulls the first working fluid, and the at least one first flow control device 412 and the at least one second flow control device 414 are in series with one another or are in a push/pull configuration. The arrows in FIG. 4A illustrate the direction of flow of the working fluid.

In some embodiments, the at least one first control device 412 is positioned at an entrance of the at least one inlet 408 and the at least one second control device 414 is positioned at an exit of the at least one outlet 410. In further embodiments, the at least one first control device 412 is configured to push the first working fluid through the at least one inlet 408 and the at least one second control device 414 is configured to pull the first working fluid through at least one outlet 410. In certain embodiments, the battery thermal management system 400 further includes a flow path for the first working fluid in which the first working fluid is in thermal communication with the at least one battery. The flow path, in some embodiments, receives the first working fluid from the at least one outlet 410. In other embodiments, the first working fluid is substantially thermally or electrically isolated from the at least one battery. For example, the thermoelectric device 404 can include two sides including a cooler side and a hotter side. The first working fluid can be in thermal communication with only the cooler side or the hotter side, and the first working fluid can be substantially thermally isolated from the other side.

In certain embodiments, the battery thermal management system 400 includes at least one second conduit 416 including at least one inlet 418 configured to allow a second working fluid to enter and flow into the at least one second conduit 416 and into thermal communication with the at least one thermoelectric device 404. For example, a heat exchanger 426 can transfer heat between the at least one thermoelectric device 404 and the second working fluid. The at least one second conduit 416 includes at least one outlet 420 configured to allow the second working fluid to exit and flow from the at least one second conduit 416 and away from being in thermal communication with the at least one thermoelectric device 404. The battery thermal management system 400 includes at least one third flow control device 422 which directs the second working fluid through the at least one inlet 418 of the at least one second conduit 416, and at least one fourth flow control device 424 which directs the second working fluid through the at least one outlet 420 of the at least one second conduit 416. The at least one third flow control device 422 and the at least one fourth flow control device 424 are each separately operable from one another.

The arrows in FIG. 4A illustrate the direction of flow of the first working fluid and the second working fluid. In certain embodiments, the first working fluid is substantially thermally isolated from the second working fluid. For example, the first working fluid can be in thermal communication with a first side of the TE device 404 and the at least one battery 402a-d, and the second working fluid can be in thermal communication with a second side of the TE device 404 different from the first side. Furthermore, the at least one battery 402a-d can be selectively heated or cooled and the first working fluid and second working fluid can be correspondingly heated or cooled. For example, the first side of the TE device 404 can be selected to heat or cool the at least one battery 402a-d by heating or cooling the first working fluid and transferring heat between the at least one battery 402a-d and the first working fluid, and the second working fluid can be correspondingly cooled if the first working fluid is heated or heated if the first working fluid is cooled.

In certain embodiments, a method of thermally managing a battery thermal management system 400 includes transferring heat between at least one battery 402a-d and at least one thermoelectric device 404 and flowing a working fluid through at least one first fluid conduit 406 in thermal communication with the at least one thermoelectric device 404. The method further includes operating at least one first flow control device 412 to direct the working fluid to be in thermal communication with the at least one thermoelectric device 404 and operating at least one second flow control device 414 to direct the working fluid away from being in thermal communication with the at least one thermoelectric device 404. In some embodiments, the working fluid flows past, along, or around the at least one battery 402a-d and heat is transferred from or to the at least one battery 402a-d. In other embodiments, the at least one battery 402a-d is in substantially direct thermal communication with the TE device 404 and a working fluid does not transfer heat between the at least one battery 402a-d and the TE device. In some embodiments, the working fluid is substantially thermally isolated from the at least one battery 402a-d and heat is transferred between the TE device 404 and working fluid. For example, the working fluid can transfer waste heat away from the TE device 404.

Figure 4B:
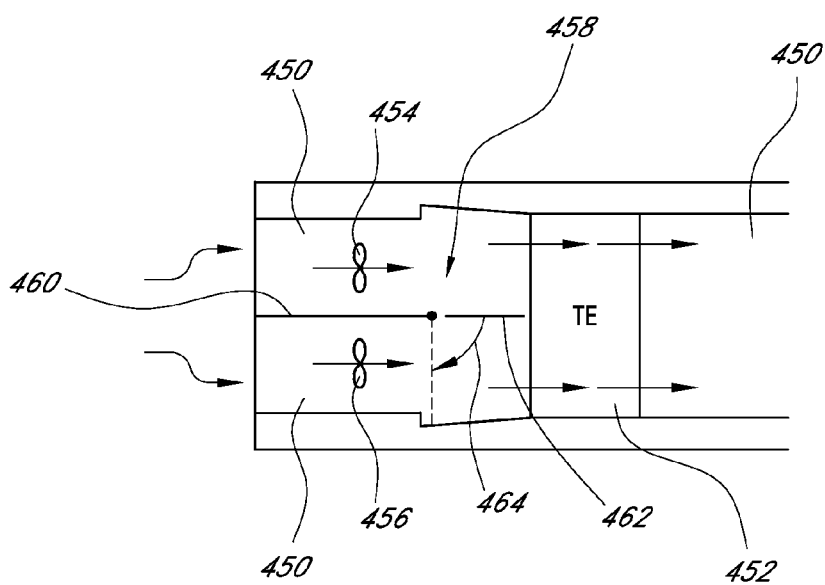
FIG. 4B is an example thermal management system illustrating flow of a working fluid with flow control devices in parallel in accordance with certain embodiments described herein.

FIG. 4B illustrates a fluid conduit 450 of a battery thermal management system in accordance with certain embodiments described herein. For comparison, FIG. 4B is an example of flow control devices working in parallel while FIG. 4A is an example of flow control devices working in series. In certain embodiments, a battery thermal management system includes at least one battery and at least one thermoelectric device 452 in thermal communication with the at least one battery. The battery thermal management system further includes at least one fluid conduit 450 configured to allow a working fluid to flow therein and to transfer the working fluid into being in thermal communication with the at least one thermoelectric device 452 or away from being in thermal communication with the at least one thermoelectric device 452. At least one first flow control device 454 directs the working fluid through the at least one fluid conduit 450, and at least one second flow control device 456 directs the working fluid through the at least one fluid conduit 450. The at least one first flow control device 454 and the at least one second flow control device 456 are each separately operable from one another.

The battery thermal management system also includes at least one divider portion 458 that is selectively positionable to block the working fluid from flowing between the at least one fluid conduit 450 and a selected one of the at least one first flow control device 454 and the at least one second flow control device 456. For example, a divider wall 460 can separate the at least one fluid conduit 450, and a flapper valve 462 can be positioned to block flow of the working fluid through either the first flow control device 454 or the at least one second flow control device 456. The dotted line in FIG. 4B illustrates the flapper valve 462 blocking the flow through the at least one second flow control device 456, and the arrow 464 illustrates how the flapper valve 462 can rotate to block the flow of the working fluid from flowing through the at least one second flow control device 456. The flapper valve 462 prevents back flow of the working fluid through an inoperative flow control device. The other arrows in FIG. 4B illustrate the direction of flow of the working fluid.

In certain embodiments, the at least one divider portion 458 is positionable in multiple positions including: (1) a first position permitting the working fluid to flow between the at least one fluid conduit 450 and the at least one first flow control device 454 and permitting the working fluid to flow between the at least one fluid conduit 450 and the at least one second flow control device 456, (2) a second position permitting the working fluid to flow between the at least one fluid conduit 450 and the at least one first flow control device 454 and blocking the working fluid from flowing between the at least one fluid conduit 450 and the at least one second flow control device 456, and (3) a third position blocking the working fluid from flowing between the at least one fluid conduit 450 and the at least one first flow control device 454 and permitting the working fluid to flow between the at least one fluid conduit 450 and the at least one second flow control device 456.

In some embodiments, the battery thermal management system can include both flow control devices in series and parallel. For example, the at least one first flow control device 412 in FIG. 4A can include at least two first flow control devices. Furthermore, the battery thermal management system 400 can include at least one divider portion that is selectively positionable to block the working fluid from flowing between the at least one first fluid conduit 406 and a selected one of the at least one first flow control devices 412. In certain embodiments, the divider portion separates at least a portion of the at least one inlet or the at least one outlet into at least two fluid channels comprising a first fluid channel and a second fluid channel. At least one flow control device of the at least two first flow control devices 412 directs the first working fluid through a first fluid channel, and at least one other flow control device of the at least two first flow control devices directs the first working fluid through a second fluid channel. Each of the at least two first flow control devices are each separately operable from one another.

In certain embodiments, a method of thermally managing a battery system includes transferring heat between at least one battery and at least one thermoelectric device 452 and flowing a working fluid through a fluid conduit 450 in thermal communication with at least one thermoelectric device 452. The method further includes directing the working fluid through the fluid conduit 450 using at least one first flow control device 454 and at least one second flow control device 456 and selectively inhibiting flow of the working fluid through a selected one of the at least one first flow control device 454 and the at least one second flow control device 456.

The reliability of the electrical power provided by the BTMS can also be improved. In certain embodiments, the battery thermal management system includes a plurality of power lines and/or redundancy with the power source or supply. For example, the power supply can have several power conversion phases and energy filtering and/or storage components. Other methods of providing electrical power redundancy may also be provided. While performance such as ripple or drop out may occur as the result of a single failure, cooling or heating can continue to be provided.

Thermal Management Systems

In certain embodiments, the TE device is put in close proximity to the battery. For example, TE device may be attached, coupled, or integrated with the battery or a battery case. To improve efficiency of the BTMS, increase heating and/or cooling capacity, and/or increase temperature control uniformity across a battery, the cooling or heating side of a TE device can be advantageously positioned as close to the battery as possible. Furthermore, the cooling or heating power that may be lost through ducts or insulation can directly condition the system. Conditioning can include transferring heat to the battery to increase the temperature of the battery or transferring heat from the battery to decrease the temperature of the battery. As a result, the thermal power generated that leaks out of at least a portion of the ducts, conduits, or other mechanisms that direct a conditioned working fluid, often still can be at least partially utilized. Thus, in certain embodiments, the conditioning surfaces such as ducts, tubes, etc. are positioned generally toward the working fluid, battery, or volume to be cooled, and the heat rejection side generally away from the conditioned surfaces and area.

Figure 7:
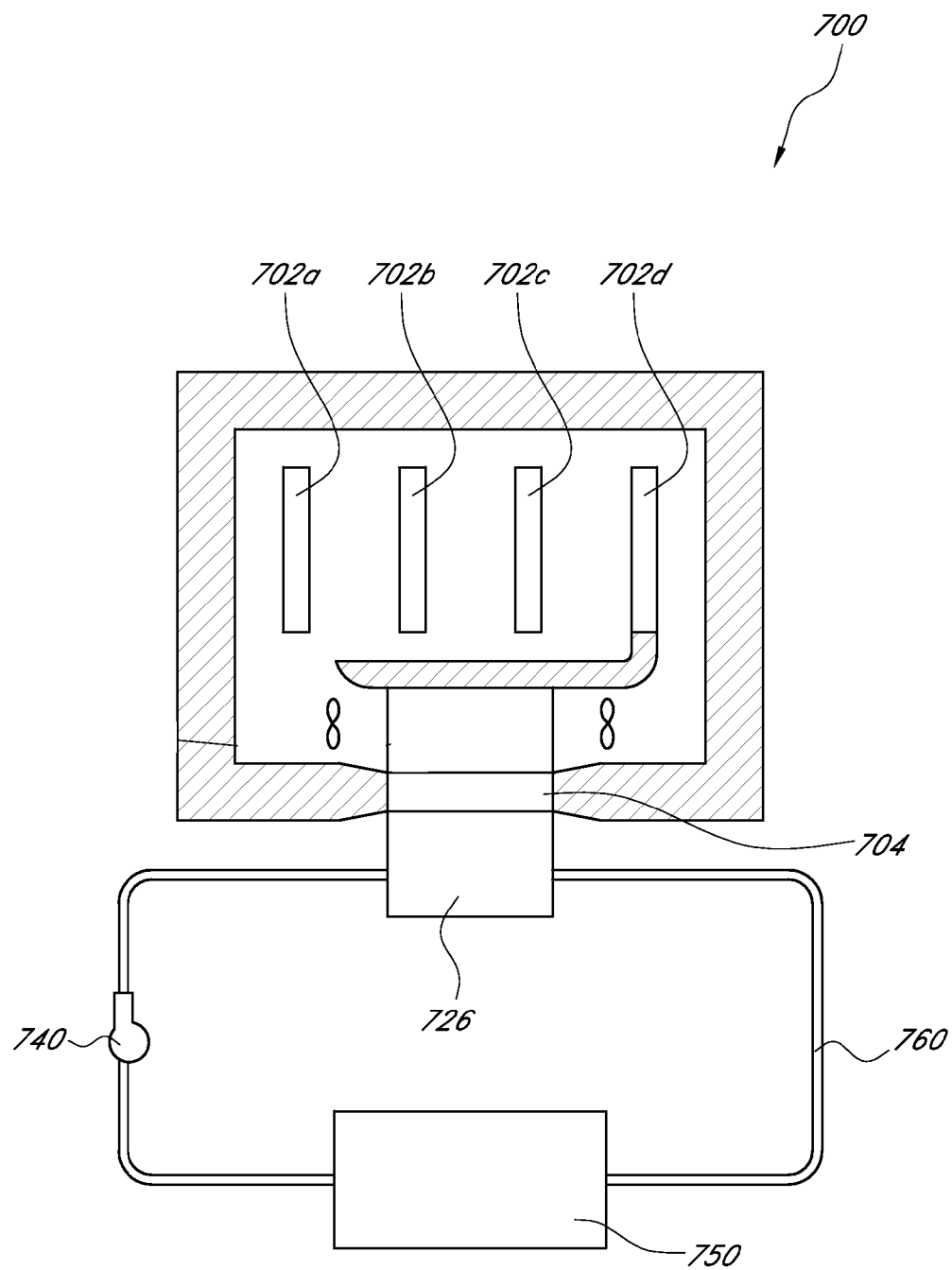
FIG. 7 is an example thermal management system that includes a fluid conduit loop in accordance with certain embodiments described herein.

FIG. 7 illustrates an example battery thermal management system 700 that includes at least one conduit 760 (e.g. fluid circuit) in accordance with certain embodiments described herein. The battery thermal management system 700 includes at least one battery 702a-d and at least one thermoelectric device 704 in thermal communication with the at least one battery 702a-d. The battery thermal management system 700 includes at least one flow control device 740 such as a fluid pump. The at least one flow control device 740 circulates the working fluid through the at least one conduit 760. In some embodiments, the working fluid is re-circulated through the at least one conduit 760. The working fluid may flow into thermal communication with the at least one thermoelectric device 704, and the working fluid may flow away from being in thermal communication with the at least one thermoelectric device 704. For example, at least one heat exchanger 726 may be in thermal communication with the at least one thermoelectric device 704. The working fluid may flow into thermal communication with the at least one heat exchanger 726 and the working fluid may flow away from being in thermal communication with the at least one heat exchanger 726. The same working fluid may flow into and away from being in thermal communication with the at least one thermoelectric device 704 more than once. For example, the at least one conduit 760 can be a fluid loop.

In certain embodiments, the battery thermal management system 700 includes a fluid reservoir or source 750 fluidly coupled with the at least one conduit 760. The fluid reservoir or source 750 may heat or cool the working fluid. For example, the fluid reservoir or source 750 can be connected to other sources of heat such as an engine powertrain fluid to provide further heat to the at least one battery 702a-d. In another example, the fluid reservoir or source 750 can include a radiator such as a vehicle chassis or an auxiliary radiator to reject heat from the at least one battery 702a-d through the at least one TE device 704.

The working fluid can be any type of fluid such as liquid, gas, or multipurpose solid-liquid convection medium. In certain embodiments, the working fluid comprises a mixture of water and glycol. A liquid working fluid may have a greater thermal capacity than a gas working fluid, which can result in greater efficiency for the TE device 704. In particular, many heat exchangers with fins, etc. have a higher thermal coefficient of performance or a higher heat transfer rate with the working fluid when the working fluid is a liquid than when the working fluid is a gas (e.g., air). A higher thermal coefficient of performance can reduce the temperature drop across the interface between the working fluid and the heat exchanger 726. Thus, the total temperature drop between the TE device 704 and the working fluid can be reduced. A lower temperature drop can result in higher efficiency for the TE device 704 and/or higher temperature differential across the TE device 704.

Figure 5:
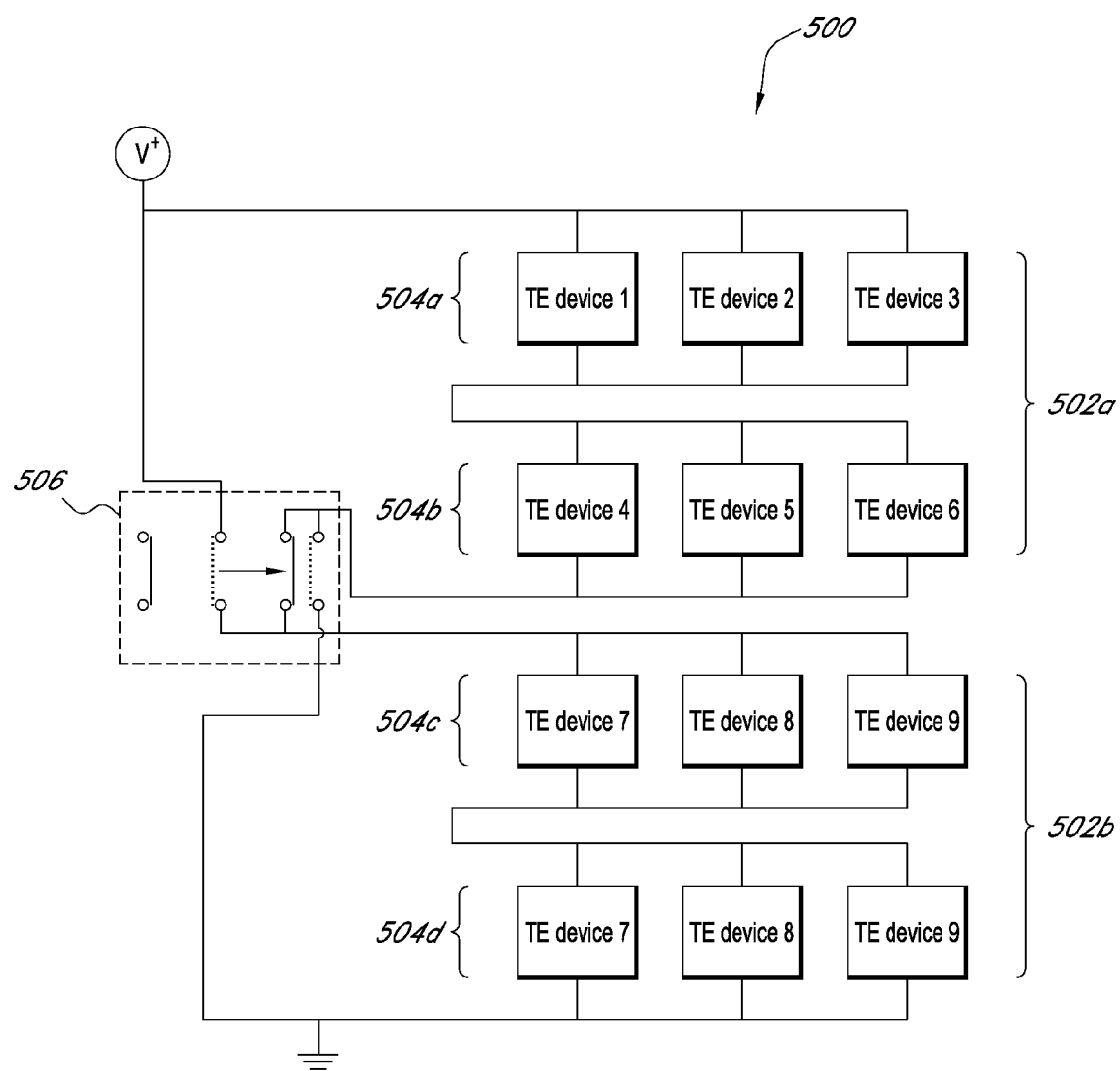
FIG. 5 is a schematic circuit diagram of an example thermal management system that includes a control that can be configured to be selectively switchable to place two thermoelectric assemblies either in series electrical communication or parallel electrical communication with one another in accordance with certain embodiments described herein.

The thermal output of a BTMS may be varied to accommodate various conditions, including operation in extreme environments. FIG. 5 is a schematic circuit diagram of an example thermal management system 500 comprising a plurality of TE devices configured to change thermal power output by changing the electrical configuration of the TE devices in accordance with certain embodiments described herein. For example, under extreme ambient heat (or cold), it may be desirable to increase the current through the TE devices to increase cooling (or heating) thermal power output. The TE devices can be TE elements, TE assemblies, or TE modules.

In certain embodiments, at battery thermal management system 500 includes at least one battery and a plurality of thermoelectric assemblies 502a, 502b in thermal communication with the at least one battery. Each thermoelectric assembly 502a, 502b includes a plurality of thermoelectric devices. A first thermoelectric assembly 502a of the plurality of thermoelectric assemblies is in electrical communication with a second thermoelectric assembly 502b of the plurality of thermoelectric assemblies. A circuit 506 is in electrical communication with the first thermoelectric assembly 502a and the second thermoelectric assembly 502b. The circuit 506 can be configured to be selectively switchable to place the first thermoelectric assembly 502a and the second thermoelectric assembly 502b either in series electrical communication or parallel electrical communication with one another.

In some embodiments, at least some of the plurality of thermoelectric elements of the first thermoelectric assembly 502a can be in series electrical communication and/or in parallel electrical communication with one another, and at least some of the plurality of thermoelectric elements of the second thermoelectric assembly 502b can be in series electrical communication and/or parallel electrical communication with one another. For example, the first thermoelectric assembly 502a can include a first plurality of TE groups 504a, 504b, and the second thermoelectric assembly 502b can include a second plurality of TE groups 504c, 504d. As illustrated in FIG. 5, a first TE group 504a of TE devices are in parallel electrical communication with one another, a second TE group 504b of TE devices are in parallel electrical communication with one another, a third TE group 504c of TE devices are in parallel electrical communication with one another, and a fourth TE group 504d of TE devices are in parallel electrical communication with one another. The first TE group 504a is in series electrical communication with the second TE group 504b, and the third group 504c is in series electrical communication with the fourth TE group 504d. Similar features as discussed with regard to FIG. 1 can be included with certain embodiments that include a circuit 506 that can be configured to be selectively switchable to place the first thermoelectric assembly 502a and the second thermoelectric assembly 502b either in series electrical communication or parallel electrical communication with one another.

The solid lines in the circuit 506 of FIG. 5 illustrate a first circuit position wherein the first TE group 504a, the second TE group 504b, the third TE group 504c, and the fourth TE group 504d are in series electrical communication with one another. The dotted lines in the circuit 506 of FIG. 5 illustrate a second circuit position wherein the first TE group 504a is in series electrical communication with the second TE group 504b, the third TE group 504c is in series electrical communication with the fourth TE group 504d, and the first thermoelectric assembly 502a (e.g., the first TE group 504a and the second TE group 504b) is in parallel electrical communication with the second thermoelectric assembly 502b (e.g., the third TE group 504c and the fourth TE group 504d).

In certain embodiments, a method of thermally managing a battery thermal management system 500 includes providing a battery system including at least one battery and a plurality of thermoelectric assemblies 502a, 502b in thermal communication with the at least one battery. The method further includes measuring at least one parameter of the battery system and switching, in response to the at least one parameter, a first thermoelectric assembly 502a of the plurality of thermoelectric assemblies between being in parallel or series electrical communication with a second thermoelectric assembly 502b of the plurality of thermoelectric assemblies. The at least one parameter can, for example, include temperature of the at least one battery and/or the battery system. Additional parameters are discussed in the following sections.

In some embodiments, the plurality of thermoelectric assemblies are selectively operable to either heat or cool the at least one battery. The circuit 506 may also be selectively switchable to adjust current flow through the first thermoelectric assembly 502a and the second thermoelectric assembly 502b. Furthermore, voltage of the circuit 502 can be altered to cause more or less current to flow through the TE devices in order to modify heat pumping capacity of the TE devices. The performance of the BTMS can be altered by, for example, altering fan and/or pump operation to change working fluid flow conditions such as flow rate and/or flow paths. The BTMS can further include a controller to control the circuit 502, flow control devices, etc. of the BTMS. The controller may be integrated with the BTMS or may be an external controller.

Battery Thermal Management Systems with Monitoring Systems

Figure 6:
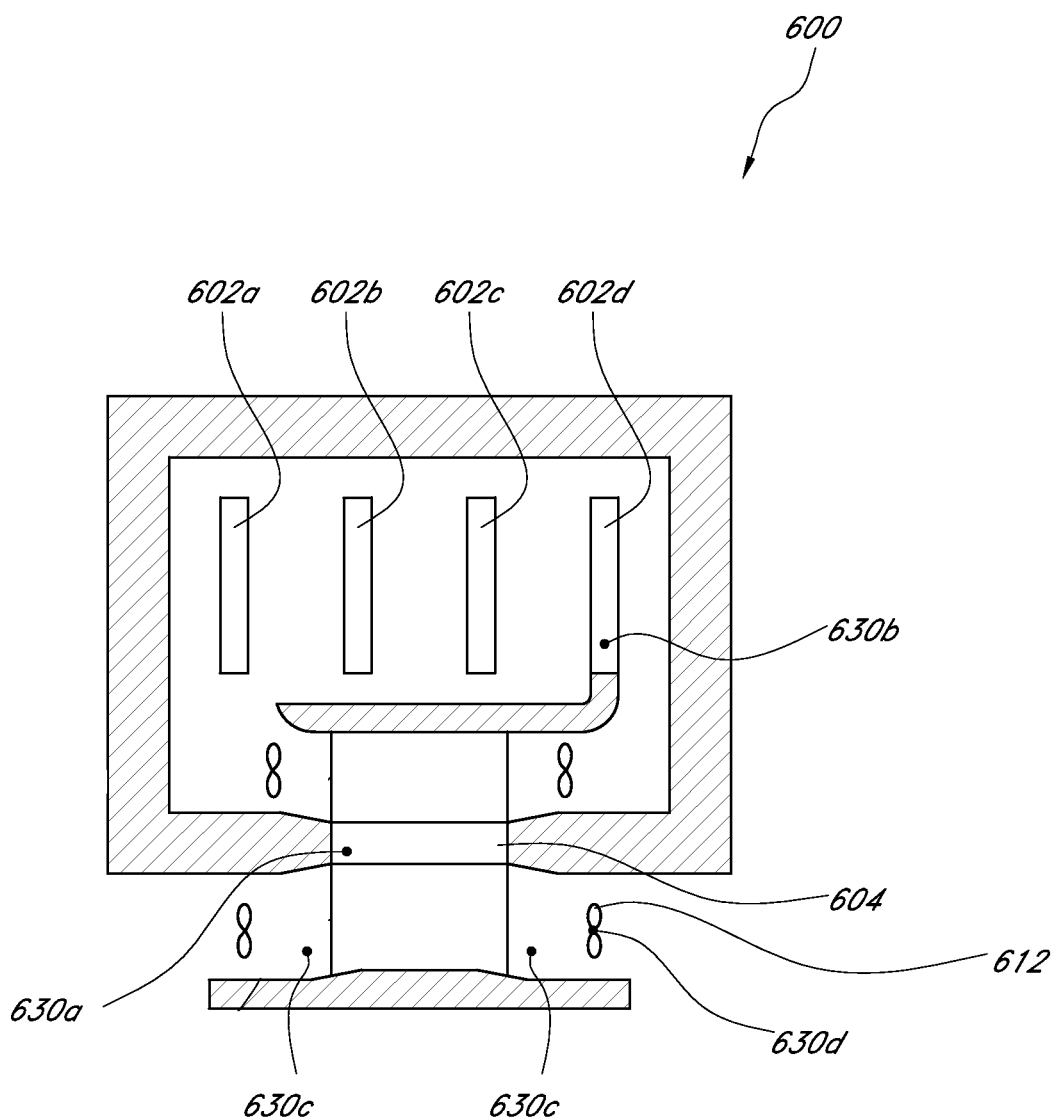
FIG. 6 is an example thermal management system that includes monitoring systems to measure at least one parameter in accordance with certain embodiments described herein.

Thermal management can be important to the proper operation and life of a battery or battery array, so monitoring temperatures and other parameters to determine the state of operation of the BTMS can be advantageous. Several conditions can also be monitored simultaneously and/or periodically or at various times to assure proper function and address operational discrepancies. Monitoring sensors and devices can be incorporated into the TE devices, fans and/or pumps the electrical circuitry and other parts of the system to provide useful information. FIG. 6 illustrates examples of a plurality of monitoring systems 630a-d and their locations in a BTMS 600 in accordance with certain embodiments described herein.

A TE device 604 can include one or more monitoring systems 630a-d including TE device monitoring systems 630a, battery monitoring systems 630b, working fluid monitoring systems 630c, and flow control device monitoring systems 630d that can measure at least one parameter. The monitoring systems 630a-d can be integrated within, on a surface of, neighboring, or within proximity to measure the at least one parameter of the TE device 604, battery 602a-d, working fluid, flow control device 612, etc. For example, components such as fans, circuit elements, battery parts, batteries, components of a battery, battery arrays and/or BTMS can include monitoring systems 630a-d.

A monitoring system 630a-d can include one or more temperature sensors. Temperature sensors can include thermistors, positive temperature coefficient-thermal cutoffs, thermocouples and other temperature sensing and temperature activated devices. Temperatures that can be monitored can include, for example, working fluid, working fluid inlet, working fluid inlet temperature, working fluid outlet, working fluid outlet temperature, inlet fluid temperatures, conditioned fluid temperatures, temperature differentials between fluid inlets and outlets, temperature between the conditioning side and the heat rejection side, conditioning side temperature measurement, heat rejection side temperature measurement, fluid control device (e.g., pump or fan) temperatures, fluid control device temperature measurement. Furthermore, multiple measurements at several locations and any other combination of temperature measurements may be made.

In addition to temperature, fluid control device speeds, fluid control device voltages and/or currents, fluid flow rates at one or multiple locations, emissions of fluids from the battery, battery array or any other device, fluid velocities, battery voltages and/or currents, battery or battery dimensions and/or dimensional change can be monitored. Furthermore, at least one monitoring system can include circuit sensors to monitor electrical communication of circuits and/or TE devices 604.

Monitoring systems can also provide a signal or be in communication with a control device. In some embodiments, the control device may measure the at least one parameter that is monitored, and the control device may, in response to the at least one parameter, cause at least one component of the BTMS to change. For example, the control device may apply an algorithm to the measured parameter to determine what response, if any, the control device may apply to a component of the BTMS. Control devices can include devices that acquire sensor data, perform calculations based on the sensor data, and cause at least one component of the BTMS to change such as valves, blower speed controllers and other devices to actuate or reduce/increase flow rate, etc., and parametric controllers.

In addition, at least one parameter (e.g., a signal) can be monitored to determine the exposure the battery, battery array or BTMS may have experienced and any other operating history of the BTMS that may be useful. The monitoring can be done for warranty, determining charge cycle (e.g., optimizing speed of charge), state of operation, safety, optimizing performance, increasing longevity, establishing operational history, indicating failure, modifying battery charge schedules based on measured values, indicating impending degradation of performance and any other diagnostic measurements.

Battery Thermal Management Systems with Additional Features

In addition to the components, sensors, functions, etc. discussed above, the BTMS may contain control, communication, computational, storage and/or processing capabilities to act upon the information collected by components of the BTMS and/or other systems in communication with the BTMS and communicate results of information processed by the BTMS and/or other systems. Thus, the BTMS may contain electronic signal processing hardware, input/output devices, permanent recording hardware or any other useful electronic or other signal processing equipment. The system may have the capacity to take actions, send signals, receive signals, store information, perform logic functions, control temperatures, fan and/or pump, TE, and any other subsystem function, modify operation and/or perform any other function to manage battery or battery array operation.

Various embodiments have been described above. Although the invention has been described with reference to these specific embodiments, the descriptions are intended to be illustrative and are not intended to be limiting. Various modifications and applications may occur to those skilled in the art without departing from the true spirit and scope of the invention as defined in the appended claims.

What is claimed is:

1. A battery thermal management system comprising:
   at least one battery;
   at least a first thermoelectric assembly and a second thermoelectric assembly in thermal communication with the at least one battery, the at least first and second thermoelectric assemblies each comprise thermoelectric devices, wherein the first thermoelectric assembly is in electrical communication with the second thermoelectric assembly;
   wherein the first thermoelectric assembly comprises at least a first group of the thermoelectric devices and a second group of the thermoelectric devices, wherein the thermoelectric devices of the first group are in parallel electrical communication with one another and the thermoelectric devices of the second group are in parallel electrical communication with one another,
   wherein the second thermoelectric assembly comprises at least a third group of the thermoelectric devices and a fourth group of the thermoelectric devices, wherein the thermoelectric devices of the third group are in parallel electrical communication with one another and the thermoelectric devices of the fourth group are in parallel electrical communication with one another,
   wherein each of the thermoelectric devices comprise a plurality of thermoelectric elements; and
   a circuit in electrical communication with the first thermoelectric assembly and the second thermoelectric assembly, the circuit configured to be selectively switchable to place the first thermoelectric assembly either in series electrical communication or parallel electrical communication with the second thermoelectric assembly in response to at least one parameter,
   wherein the at least one parameter comprises at least one temperature of a working fluid that flows into thermal communication with the at least one battery.

2. The battery thermal management system of claim 1, wherein at least some of the plurality of thermoelectric elements of the first thermoelectric assembly are in series electrical communication with the at least some of the plurality of thermoelectric elements of the first thermoelectric assembly and at least some of the plurality of thermoelectric elements of the second thermoelectric assembly are in series electrical communication with the at least some of the plurality of thermoelectric elements of the second thermoelectric assembly.

3. The battery thermal management system of claim 1, wherein at least some of the plurality of thermoelectric elements of the first thermoelectric assembly are in parallel electrical communication with the at least some of the plurality of thermoelectric elements of the first thermoelectric assembly.

4. The battery thermal management system of claim 1, wherein the first group of the thermoelectric devices is in series electrical communication with the second group of the thermoelectric devices.

5. The battery thermal management system of claim 4, wherein the third group of the thermoelectric devices is in series electrical communication with the fourth group of the thermoelectric devices.

6. The battery thermal management system of claim 1, wherein the at least first and second thermoelectric assemblies are selectively operable to either heat or cool the at least one battery.

7. The battery thermal management system of claim 1, wherein the circuit is selectively switchable to adjust current flow through the first thermoelectric assembly and the second thermoelectric assembly.

8. The battery thermal management system of claim 1, wherein the at least one temperature of the working fluid comprises at least one of inlet fluid temperature, a conditioned fluid temperature, and a temperature differential between fluid inlet and outlet.

9. The battery thermal management system of claim 1, wherein the at least one temperature of the working fluid of the at least one parameter comprises:

a working fluid inlet temperature; and
a working fluid outlet temperature.

10. The battery thermal management system of claim 1, wherein the at least one parameter is measured at a plurality of locations within the system.

11. The battery thermal management system of claim 10, wherein the plurality of locations comprises a working fluid inlet and a working fluid outlet of the system.

12. The battery thermal management system of claim 1, wherein the at least one parameter further comprises the temperature of the at least one battery.

13. The battery thermal management system of claim 1, wherein the at least one parameter further comprises at least one of (i) a temperature difference between a conditioning side and a heat rejection side or (ii) a fluid control device temperature.

14. The battery thermal management system of claim 1, wherein the at least one parameter further comprises:

a conditioning side temperature measurement;
a heat rejection side temperature measurement; and
a fluid control device temperature measurement.

15. The battery thermal management system of claim 1, wherein performance of the system is altered by changing at least one of a flow path of the working fluid or a flow rate of the working fluid.

* * * * *